United States Patent [19]

Tippett et al.

[11] Patent Number: 5,837,215
[45] Date of Patent: Nov. 17, 1998

[54] METHOD OF REMOVING INSOLUBLE MATERIALS FROM BAYER PROCESS WITH FATTY ACID AND FATTY ACID FREE POLYMER FLOCCULANTS

[75] Inventors: James Morton Tippett, Oatley; Graeme John Farquarson, Carlton, both of Australia; Radhakrishnan Selvarajan, Downers Grove; John T. Malito, Oswego, both of Ill.

[73] Assignee: Nalco Chemical Company, Naperville, Ill.

[21] Appl. No.: 896,591

[22] Filed: Jul. 18, 1997

Related U.S. Application Data

[60] Division of Ser. No. 566,345, Dec. 1, 1995, which is a continuation-in-part of Ser. No. 506,936, Jul. 26, 1995, abandoned.

[51] Int. Cl.⁶ ........................................................ C01F 7/00
[52] U.S. Cl. ........................ 423/600; 423/625; 423/121; 423/122; 423/130
[58] Field of Search ........................ 423/600, 625, 423/121, 122, 130

[56] References Cited

U.S. PATENT DOCUMENTS

| | | | |
|---|---|---|---|
| Re. 28,474 | 7/1975 | Anderson et al. | 523/336 |
| Re. 28,576 | 10/1975 | Anderson et al. | 523/336 |
| 3,284,393 | 11/1966 | Vanderhoff et al. | 524/801 |
| 3,624,019 | 11/1971 | Anderson et al. | 523/336 |
| 3,734,873 | 5/1973 | Anderson et al. | 523/336 |
| 3,767,629 | 10/1973 | Vallino, Jr. et al. | 526/84 |
| 3,826,771 | 7/1974 | Anderson et al. | 524/831 |
| 3,915,920 | 10/1975 | Slovinsky et al. | 524/521 |
| 3,975,496 | 8/1976 | Smalley et al. | 423/122 |
| 3,979,348 | 9/1976 | Ballweber et al. | 524/512 |
| 3,996,180 | 12/1976 | Kane | 524/801 |
| 3,997,492 | 12/1976 | Kane et al. | 524/801 |
| 4,024,097 | 5/1977 | Slovinsky et al. | 524/801 |
| 4,076,648 | 2/1978 | Rosen | 252/358 |
| 4,090,992 | 5/1978 | Scanley | 524/555 |
| 4,102,845 | 7/1978 | Schröder et al. | 524/377 |
| 4,435,528 | 3/1984 | Domina | 524/801 |
| 4,952,642 | 8/1990 | Fong | 524/344 |
| 5,008,089 | 4/1991 | Moody et al. | 210/727 |
| 5,041,269 | 8/1991 | Moody et al. | 423/127 |
| 5,217,620 | 6/1993 | Mahoney et al. | 423/121 |
| 5,284,894 | 2/1994 | Wasyliw et al. | 524/377 |
| 5,427,750 | 6/1995 | Sommese et al. | 423/735 |
| 5,461,104 | 10/1995 | Daniel et al. | 524/505 |
| 5,478,477 | 12/1995 | Ramesh et al. | 423/121 |
| 5,525,657 | 6/1996 | Anchor et al. | 524/505 |

OTHER PUBLICATIONS

Hawley's "Condensed Chemical Dictionary", p. 507 Twelfth Edition.

*Primary Examiner*—James J. Seidleck
*Assistant Examiner*—Olga Asinovsky
*Attorney, Agent, or Firm*—Elaine M. Ramesh; Thomas M. Breininger

[57] ABSTRACT

A method for flocculation of red mud in Bayer Process streams utilizing a fatty acid or fatty acid ester free latex polymer flocculant. Preferred fatty acid free emulsifiers useful for the preparation of such flocculants are obtained by reacting ethylene and/or propylene oxide with a reagent selected from the group consisting of ethylene diamine, ethanol and ethylene glycol.

8 Claims, No Drawings

METHOD OF REMOVING INSOLUBLE MATERIALS FROM BAYER PROCESS WITH FATTY ACID AND FATTY ACID FREE POLYMER FLOCCULANTS

REFERENCE TO RELATED PATENT

This application is a division of application Ser. No. 08/566,345, filed Dec. 1, 1995 pending which is a continuation-in-part of application Ser. No. 08/506,936, filed Jul. 26, 1995 by Graeme John Farquharson and James Morton Tippett, entitled "Fatty Acid Free Polymer Flocculants", the disclosure of which is incorporated herein by reference.

BACKGROUND OF THE INVENTION

1. Field of the Invention

The invention relates to latex polymers which are suitable for use as red mud flocculants in the Bayer process and as anti-foaming agents in industrial process fluids, as well as to a method for their production.

2. Description of the Prior Art

In the Bayer process, bauxite ore is digested in a caustic slurry to solubilise the alumina values in the ore. The insoluble material (red mud) is then removed by sedimentation in thickeners which results in an alumina liquor which is then seeded to produce the desired alumina. Generally, the underflow from the thickener is additionally washed in a series of vessels to recover further alumina values and caustic.

Sedimentation of the insoluble material in the thickeners and washing vessels is generally aided by the addition of appropriate flocculants. Suitable flocculants include acrylic acid polymers, including their sodium, ammonium and hydroxamate salts, or copolymers of acrylic acid with acrylamide.

The flocculants are generally applied as either a latex emulsion or as a powder. Small amounts of surfactants such as those based on fatty acids (i.e., oleic acid and its hydrogenated homologs) are typically incorporated with the flocculant on production for example, to stabilize the latex during emulsion polymerization; to stabilize monomer solution droplets during bead polymerization or to aid anticaking in powder.

Fatty acid surfactants are also known to enter into the Bayer process because they naturally occur with the bauxite.

It is known that in some circumstances the presence of fatty acid surfactants in the Bayer process liquor severely interferes with the operation of the Bayer process, i.e., the presence of fatty acid surfactants can interfere with the removal of sodium oxalate by preventing precipitation thereof or by altering the morphology of the sodium oxalate crystals.

There is therefore a need to reduce the amount of fatty acid surfactants which enters the Bayer process.

The use of free fatty acids or esters of fatty acids including ethoxylates, sorbitol esters, etc. or amides of fatty acids are unsuitable for most antifoaming applications. These esters and amides are susceptible to hydrolyze under strong basic conditions to yield the free fatty acid. The free fatty acid in turn causes undesirable problems such as foaming or oxalate growth inhibition.

SUMMARY OF THE INVENTION

A method for preparing a fatty acid or fatty acid ester free latex polymer by water-in-oil polymerization comprising adding to a polymerizing solution in the absence of a fatty acid or fatty acid ester surfactant an effective amount of a fatty acid or fatty acid ester free emulsifier to stabilize the resulting latex polymer is disclosed.

DESCRIPTION OF THE PREFERRED EMBODIMENTS

According to a first aspect of the invention, there is provided a method for preparing a fatty acid free latex polymer by water-in-oil polymerization comprising adding to the polymerizing solution before or during polymerization and in the absence of a fatty acid surfactant an effective amount of a fatty acid free emulsifier to stabilize the resulting latex polymer. Under an alternative embodiment of the invention, the invention comprises preparing a fatty acid ester free latex polymer by water-in-oil polymerization comprising adding to the polymerizing solution before or during polymerization and in the absence of a fatty acid ester surfactant an effective amount of a fatty acid ester free emulsifier to stabilize the resulting latex polymer.

Suitable emulsifiers include those having a low hydrophilic-lipophilic balance (HLB), i.e., those having a HLB of approximately less than 7 such as emulsifiers obtained by reacting ethylene and/or propylene oxide with ethylene diamine, ethanol or ethylene glycol. Coemulsifiers of higher HLB i.e., those having a HLB greater than 7 such as Brij 97 and combinations of high HLB emulsifiers having a net HLB of 4 to 12 can also be used. Brij 97 is available from ICI, Australia.

According to a second aspect, there is provided a fatty acid free latex polymer produced by the method of the first aspect.

According to a third aspect, the invention relates to a method of removing insoluble materials from a Bayer process alumina slurry comprising adding the fatty acid free latex polymer of the second aspect to the slurry to flocculate the insoluble materials.

Desirably, high HLB fatty acid free emulsifiers are additionally added to the slurry to assist in dissolution of the polymer. An example of a suitable surfactant is Teric X13 which is available from ICI, Australia.

A formulation suitable for water-in-oil polymerization contains acrylic acid 22.13%, sodium hydroxide 12.30%, water 40.57%, oil 20.25%, Hypermer 2422 2.0%, Teric N4 0.5%, Vazo 64 0.05%, dimethylformamide 0.4%. Hypermer 2422 and Teric N4 are fatty acid free emulsifiers available from ICI Operations Pty Ltd, Alfred Street, Rhodes 2138, Australia. Vazo 64, an azobisisobutyronitrile, is used as the initiator and is available from Robert Bryce and Co, Australia.

In an alternative environment, the invention comprises a method of preventing foaming in industrial water systems including mineral processing streams, pulp and paper streams and waste water treatment streams by the addition of fatty acid free emulsifiers. Desirably, such fatty acid free emulsifiers would have a high hydrophilic lipophilic balance (HLB). In a preferred embodiment, the emulsifiers would be selected from the group consisting of fatty amine ethoxylates, fatty alcohol ethoxylates and alkyl oxazolines/imidazolines. Preferably, the oxazolines and imidazolines would have an alkyl group consisting of from about 11 to about 17 carbons.

Preferably, the surfactants HLB would be 9.8–12.0 for the fatty amine ethoxylate, 4.0–13.0 for the fatty alcohol ethoxylate and 4.0–6.0 for the alkyl oxazolines.

According to yet another embodiment of the application, these fatty acid free polymers may be copolymerized or terpolymerized with commonly used flocculants including acrylate, acrylic acid, acrylates of ammonia or sodium or potassium, acrylate esters, acrylamide, 2-acrylamindo-2-methyl propane sulfonic acid/salt (AMPS), styrene sulfonic acid/salt, vinylacetate and N-Vinylpyrrolidone.

Under the alternative embodiment of the invention, the mineral processing streams may be selected from alumina streams, coal, copper, kaolin, phosphoric acid, precious metals, sand and gravel, soda ash and taconite. Further, the waste water treatment water streams will include waste sludges, oil recovery waters and metals recovery waters.

EXAMPLE

A one-liter glass cylinder was filled with settler feed slurry and placed in a hot water bath (100 degrees C.). A sparge tube was immersed to the bottom of the cylinder and air was blown through the slurry for a period of approximately 5 minutes. The volume of foam (expressed as % of the slurry volume) was recorded after this time period. The air sparge was then discontinued and the time required for the foam to subside until a mirror placed behind the cylinder became visible (initial defoaming), and the time required for the foam to dissipate completely (complete defoaming), were recorded. In most tests the volume of foam, following cessation of air sparging, was recorded every minute over a 10-minute period.

Glossary:

Compound A: Red mud flocculant, 100% poly(acrylic acid salt) latex in hydrocarbon oil carrier Surf. B: Fatty alcohol ethoxylate

TABLE I

Foaming of Compound A (without new surfactants)

| Treatment | Dose mg/L | Initial Defoaming min:sec | Complete Defoaming min:sec |
| --- | --- | --- | --- |
| none | n/a | 06:35 | 14:20 |
| Compound A | 2.6 | 13:06 | 24:00 |
| Compound A | 5.4 | 22:15 | 27:00 |

TABLE II

Effect of New Surfactants on Foaming

| Treatment | Dose mg/L | Foam Vol. as % of Slurry | Initial Defoaming min:sec | Complete Defoaming min:sec |
| --- | --- | --- | --- | --- |
| none | n/a | 18 | 00:12 | 14:15 |
| Compound A | 30 | 46 | 06:20 | 10:12 |
| Compound A & 1% Surf. A | 30 | 23 | 04:26 | 07:15 |
| Compound A & 1% Surf. B | 30 | 20 | 00:05 | 00:40 |
| Compound A/1% Surf. A & Compound A/1% Surf. B | 15 & 16 | 17 | 00:06 | 00:40 |

TABLE III

Detailed Foam Performance of Compound B

| | Control (no floc) | | | | | | Compound B, 5.4 mg/L | | | | | | |
| --- | --- | --- | --- | --- | --- | --- | --- | --- | --- | --- | --- | --- | --- |
| | Test | | | | | | Test | | | | | | |
| | 1 | 2 | 3 | 4 | 5 | average | 1 | 2 | 3 | 4 | 5 | 6 | average |
| Foam @ 5 min. aeration, % of slurry volume | 40 | 83 | 40 | 56 | 44 | 52.6 | 50 | 40 | 35 | 60 | 60 | 45 | 48 |
| Foam remaining after time, % of slurry volume  min. 0 | 33 | 20 | 10 | 12 | 8 | 16.6 | 8 | 6 | 4 | 10 | 8 | 10 | 7.6 |
| 1 | 10 | 6 | 6 | 6 | 4 | 6.4 | 4 | 4 | 2 | 8 | 4 | 6 | 4.8 |
| 2 | 6 | 4 | 5 | 4 | 2 | 4.2 | 4 | 2 | 0 | 8 | 4 | 6 | 4 |
| 3 | 4 | 2 | 6 | 4 | 1 | 3.4 | 4 | 2 | 0 | 4 | 2 | 2 | 2 |
| 4 | 2 | 2 | 4 | 2 | 1 | 2.2 | 2 | 0 | 0 | 3 | 1 | 1 | 1 |
| 5 | 2 | 1 | 3 | 1 | 0 | 1.4 | 0 | 0 | 0 | 3 | 0 | 1 | 0.8 |
| 6 | 1 | 0 | 2 | 0 | 0 | 0.6 | 0 | 0 | 0 | 2 | 0 | 0 | 0.4 |
| 7 | 0 | 0 | 2 | 0 | 0 | 0.4 | 0 | 0 | 0 | 1 | 0 | 0 | 0.2 |
| 8 | 0 | 0 | 1 | 0 | 0 | 0.2 | 0 | 0 | 0 | 0 | 0 | 0 | 0 |
| 9 | 0 | 0 | 1 | 0 | 0 | 0.2 | 0 | 0 | 0 | 0 | 0 | 0 | 0 |
| 10 | 0 | 0 | 0 | 0 | 0 | 0 | 0 | 0 | 0 | 0 | 0 | 0 | 0 |
| Inital Defoaming, min. | 18 | 7 | 12 | 7 | 6 | 10 | 6 | 6 | 4 | 11 | 12 | 10 | 8.6 |
| Complete Defoaming, min. | 13 | 12 | 17 | 11 | 14 | 13.4 | 11 | 10 | 9 | 16 | 18 | 15 | 13.6 |
| Average Temperature, C. | 82 | 73 | 70 | 76 | 70 | 74.2 | 75 | 70 | 69 | 73 | 72 | 72 | 71.2 |

Compound B: Compound A formulated with 1.5% each of new surfactants A & B

Surf. A: Fatty amine ethoxylate

Changes can be made in the composition, operation and arrangement of the method of the present invention described herein without departing from the concept and scope of the invention as defined in the following claims:

We claim:

1. A method of removing water-insoluble materials from a Bayer process alumina slurry consisting essentially of:

adding a fatty acid ester free latex polymer to the alumina slurry to flocculate the water said insoluble materials;

wherein said fatty acid ester free latex polymer is prepared in the absence of fatty acids by adding to a polymerizing water-in-oil solution emulsion an effective amount of a fatty acid ester free emulsifier having a hydrophilic-lipophilic balance less than 7.

2. The method of claim 1 wherein said emulsifier is obtained by reacting ethylene and/or propylene oxide with a reagent selected from the group consisting of: ethylene diamine, ethanol, and ethylene glycol.

3. The method of claim 1 further comprising the addition of a coemulsifier to said polymerizing solution, wherein said coemulsifier is selected from the group consisting of coemulsifers having a hydrophilic-lipophilic balance greater than 7 and combinations of coemulsifiers having a net hydrophilic-lipophilic balance of 4 to 12.

4. The method of claim 1 further comprising addition of fatty acid free surfactants having a hydrophilic-lipophilic balance of from about 10 to about 18 to said slurry.

5. A method of removing water-insoluble materials from a Bayer process alumina slurry comprising adding a fatty acid free latex polymer to the slurry to flocculate said insoluble materials; wherein the fatty acid free latex polymer is prepared in the absence of a fatty acid surfactant by adding to a polymerizing water-in-oil emulsion an effective amount of a fatty acid free emulsifier having a hydrophilic-lipophilic balance less than 7.

6. The method of claim 5 wherein said emulsifier is obtained by reacting ethylene and/or propylene oxide with a reagent selected from the group consisting of: ethylene diamine, ethanol and ethylene glycol.

7. The method of claim 5 further comprising the addition of a coemulsifier to said polymerizing solution, wherein said coemulsifier is selected from the group consisting of coemulsifers having a hydrophilic-lipophilic balance greater than 7 and combinations of coemulsifiers having a net hydrophilic-lipophilic balance of 4 to 12.

8. The method of claim 5 further comprising addition of fatty acid free surfactants having a hydrophilic-lipophilic balance of from about 10 to about 18 to said slurry.

* * * * *